(12) United States Patent
Popkov et al.

(10) Patent No.: US 8,751,289 B2
(45) Date of Patent: Jun. 10, 2014

(54) SCALABLE REGRESSION FOR RETAIL PANEL DATA

(75) Inventors: Yevgeniy Popkov, Brookline, MA (US); Su-Ming Wu, Waltham, MA (US); Manish Gupte, Burlington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 210 days.

(21) Appl. No.: 13/101,276

(22) Filed: May 5, 2011

(65) Prior Publication Data

US 2012/0284084 A1  Nov. 8, 2012

(51) Int. Cl.
*G06Q 10/00* (2012.01)
(52) U.S. Cl.
USPC .................................. 705/7.31; 705/7.29
(58) Field of Classification Search
USPC ...................... 705/7.31, 7.29, 7.11
See application file for complete search history.

(56) References Cited

U.S. PATENT DOCUMENTS

| | | | |
|---|---|---|---|
| 7,251,615 B2 | 7/2007 | Woo | |
| 7,552,201 B2 | 6/2009 | Areddu et al. | |
| 2002/0165816 A1* | 11/2002 | Barz | 705/37 |
| 2005/0102175 A1* | 5/2005 | Dudat et al. | 705/10 |
| 2006/0161504 A1* | 7/2006 | Walser et al. | 705/400 |
| 2007/0156510 A1* | 7/2007 | Kim et al. | 705/10 |
| 2008/0243660 A1* | 10/2008 | Amemiya et al. | 705/35 |
| 2009/0327037 A1 | 12/2009 | Ng et al. | |
| 2010/0306031 A1 | 12/2010 | McCauley et al. | |
| 2011/0153386 A1* | 6/2011 | Kim et al. | 705/7.31 |

OTHER PUBLICATIONS

Maravall, Augustin, "Unobserved Components in Economic Time Series" from Handbook of Applied Exonometrics, 1995, Blackwell Publishers Ltd. pp. 12-72.*

* cited by examiner

*Primary Examiner* — Beth V. Boswell
*Assistant Examiner* — William Brockington, III
(74) *Attorney, Agent, or Firm* — Kraguljac Law Group, LLC

(57) ABSTRACT

Systems, methods, and other embodiments associated with scalable regression for retail panel are described. In one embodiment, a method includes performing a regression that estimates elasticity of demand for a retail item, wherein the regression is performed on a transformation of a demand model that does not include variables associated with base demand or seasonality. In a subsequent processing step, the method includes estimating a base demand and seasonality for the retail item based, at least in part, on the estimated elasticity of demand. The method may be performed in a database that stores retail panel data for the retail item and other retail items.

28 Claims, 5 Drawing Sheets

SCALABLE REGRESSION FOR RETAIL PANEL DATA

BACKGROUND

A standard problem in Retail Science is producing a week-by-week forecast of sales units for retail items. The sales of retail items in a given week is affected by many factors, such as seasonal factors, whether a discount has been applied to a retail item during the week, and at what point in the lifecycle of a merchandise the week falls. One common approach to forecasting weekly sales units involves building a "causal demand model" for retail items. This demand model is a mathematical model that describes weekly sales units in terms of factors such as the ones listed above. The factors are known as the "demand variables" for the demand model.

The demand model specifies mathematically how the demand variables affect sales units. For example, if the amount of discount is a demand variable, historical data may show that a 50% price cut resulted in a 4-fold increase in sales units. In this example, the demand variable is a 50% price cut and the historical sales data is the 4-fold increase in sales. In order for the causal demand model to be of use in forecasting sales units, it is necessary to determine the relationship of the demand variable (50% price cut) to the sales units (4-fold increase). This relationship is called the demand parameter associated with the demand variable.

In this example, the demand parameter may be determined to specify that for every 25% price reduction, sales of a particular retail item will increase by 2-fold. With the demand parameter determined, it is then possible to forecast sales units by specifying the future values of the demand variables. To continue the price-cut example, the retailer might know that next season, it will be running a 40% price cut during some weeks. The demand model will then forecast sales units for those weeks accounting for the 40% price cut.

The demand parameter is determined by examining historical retail sales data (known as retail panel data) containing price cuts for the retail item itself, or for similar retail items. However, as noted above, several demand variables affect the sales of retail items. These several demand variables apply simultaneously. For example, a retailer may have performed the 50% price cut during the summer for a summer item, in which case the 4-fold increase in sales may be partially due to an increase in seasonal demand for summer retail items during summer. To separate the effects of the several demand variables on sales, a regression is performed on the demand model to determine values for demand parameters that cause the demand model to best fit retail panel data.

Typically, thousands or hundreds of thousands of regressions are performed in a Retail Science application because a separate regression is performed for each segment of retail panel data. The usual way of segmenting sales data is by item and sales location. A typical retailer could have a very large number of combinations of retail items and locations. This type of segmenting is important to producing accurate sales forecasts, but greatly increases the amount of computation needed to produce the forecasts.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. One of ordinary skill in the art will appreciate that in some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

In practice, regression techniques can be difficult to apply for demand models used in Retail Science because these demand models typically have a large number of demand variables. This large number of variables can lead to unreasonable or unreliable results for the demand parameters. In addition, it is computationally intensive to perform hundreds of thousands of regressions, with each regression involving a large number of variables. Because of the computational intensity, the regressions cannot easily be performed in standard database systems that store retail panel data. Thus the regressions are often performed by transferring the retail panel data out of the database to a specialized computation unit.

Figure 1:
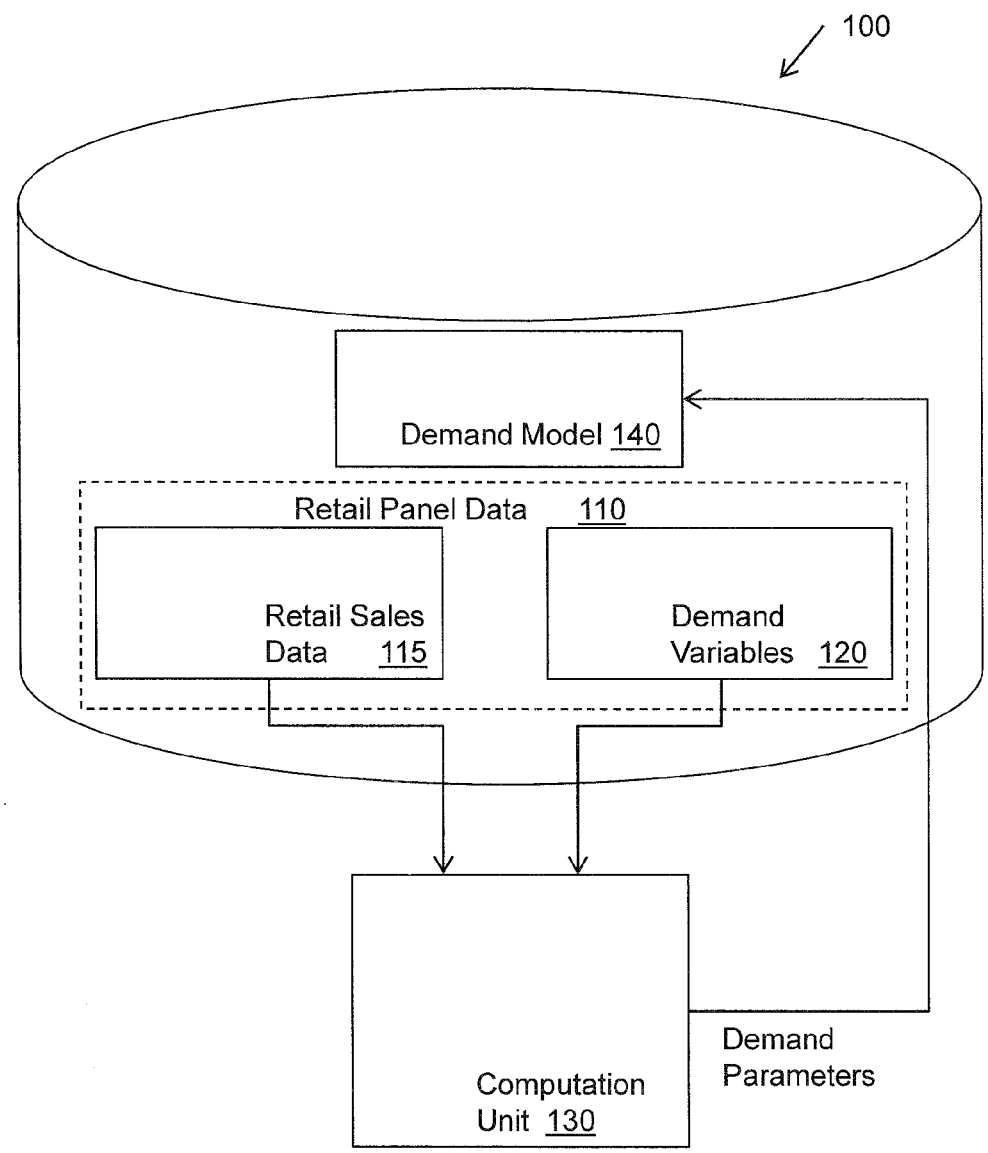
FIG. 1 illustrates a system associated with typical regression techniques for retail panel data.

FIG. 1 is a schematic diagram illustrating a typical sales forecasting system 100 that includes a database that stores a demand model 140 and retail panel data 110 for a particular retailer. The retail panel data 110 includes sales data 115 and demand variables 120 (e.g. data about promotions, inventory, and holidays that might affect sales). To create or update the demand model 140, the retail panel data 110 is transferred to a computation unit 130. The computation unit 130 may be an application server running Java and a custom multi-process framework called the Compute Farm. The computation unit 130 performs the regression and then writes the results of the regression, the demand parameters, back to the database to create the demand model 140. This approach incurs the time and cost of transferring large amounts of data in and out of the database. Further, the custom multi-process framework must be implemented and maintained in the computation unit 130 to achieve the parallel processing features that are already provided by the database.

Figure 2:
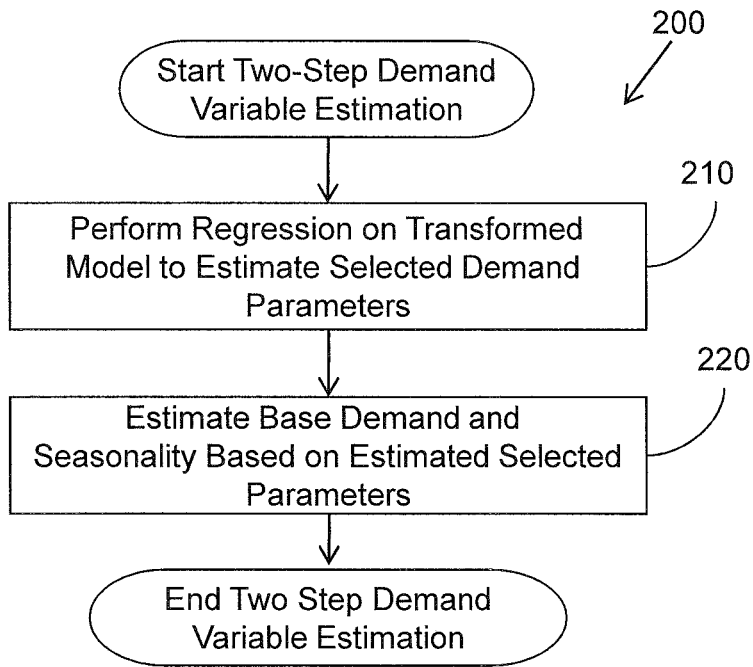
FIG. 2 illustrates an example embodiment of a method associated with scalable regression for retail panel data.

Systems and methods are described herein that transform the demand model and historical data in a manner that allows the regressions that determine demand model parameters to be performed in-database, using standard database functions, and leveraging the database's native parallel processing. In one example embodiment, this is accomplished by performing a two-step method 200 outlined in FIG. 2. At 210, a regression is performed on a transformed demand model that is expressed in terms of a limited number of selected demand parameters and does not include parameters associated with base demand or seasonality. The retail panel data is analogously transformed and the transformed retail panel data is used in the first regression. At 220, after the first regression is used to estimate the selected demand parameters in the transformed model, base demand and seasonality parameters can be obtained by solving the original demand model using the regression results.

Figure 3:
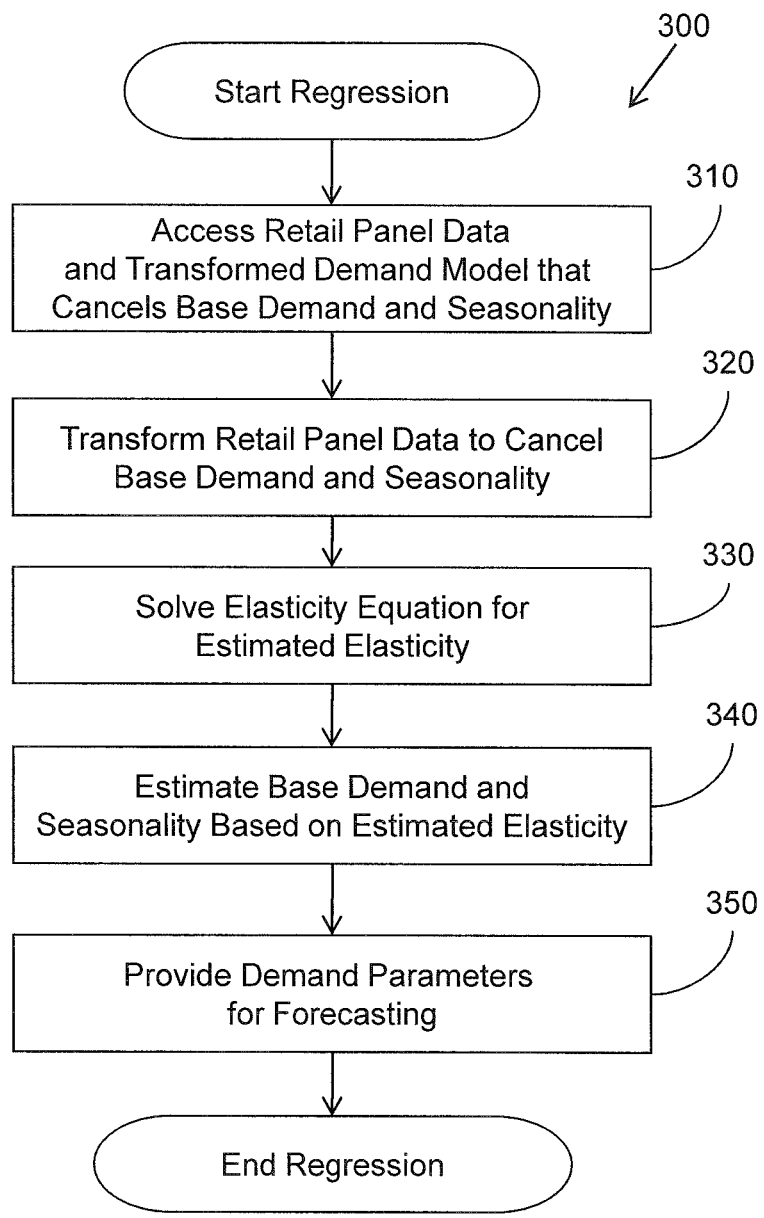
FIG. 3 illustrates another example embodiment of a method associated with scalable regression for retail panel data.

FIG. 3 illustrates an example embodiment of a regression method 300 that can be performed in a database storing retail panel data and a demand model. At 310, the retail panel data and a transformed demand model are accessed. The retail panel data typically includes sales quantities aggregated by item identifier, location of sale, and week (or day). The retail panel data also includes inventory information, prices, promotions and other causal variables that correspond in time to the sales data. The amount of retail panel data can be significant, up to $10^{10}$ rows (hundreds of gigabytes). The retail panel data often has a hierarchical structure due to relationships between retail items and retail locations.

The transformed demand model accessed at 310 is an elasticity equation that does not depend on either base demand or seasonality. For the purposes of this description, the original data model has been transformed so that it depends on elasticity. The transformed demand model may be simplified in other ways to obtain a transformed model that depends on a limited number of parameters, and thus may include additional or different parameters. The elasticity equation is obtained by transforming a demand model as follows.

Sales for a given retail item can be expressed by the following multiplicative demand model:

$$S_{i,l,w} = BD_{i,l} \cdot SE_w \cdot PE_{i,l,w} \quad \text{(Equation 1)}$$

Where i is the identifier of a given item, w is a given week, l is a given location, $S_{i,l,w}$ is the sales of item i during week w at location l. BD is a demand parameter corresponding to the effect of base demand on sales, SE is a demand parameter corresponding to the effect of seasonality on sales, and PE is a demand parameter corresponding to the effect of elasticity on sales. While only three demand parameters are included in Equation 1, other parameters may be included in the demand model. The illustrated demand parameters may represent a group of related demand parameters and/or be deduced from a large number of related demand variables. For the purposes of this description, rather than treating items and locations separately, reference is made to an "item-location." In the retail industry, an item-location typically designates a particular item selling at a particular location. Thus, in the notation that follows a subscript of i denotes "item-location" and separate subscripts for item and location will not be used.

A "double-ratio" technique is used to transform the demand model of Equation 1 into an elasticity equation that does not depend on either base demand or seasonality. A first ratio r (or arithmetic difference in logarithm-transformed variables) is constructed between instances of the demand model corresponding to two different weeks (w and w') for a same item-location is i:

$$r_{i,w} \equiv \frac{S_{i,w}}{\langle S_{i,w'} \rangle} = \frac{BD_i \cdot SE_w \cdot PE_{i,w}}{BD_i \cdot \langle SE_{w'} \rangle \cdot \langle PE_{i,w'} \rangle} \quad \text{(Equation 2)}$$

$$= \frac{SE_w}{\langle SE_{w'} \rangle} \cdot \left( \frac{P_{i,w}}{\langle P_{i,w'} \rangle} \right)^\gamma$$

$$= \frac{SE_w}{\langle SE_{w'} \rangle} \cdot (pr_{i,w})^\gamma$$

In Equation 2, all of the factors are from the same item-location i. Thus, the first ratio for each item-location is independent of first ratios for other item-locations. In Equation 2, w is from the set of weeks $W_i$ for the item-location i. For example, $W_i$ could be the $2^{nd}$, $3^{rd}$, $5^{th}$, and $6^{th}$ weeks of i.

Considerations helpful in selecting $W_i$ are described in more detail below. The weeks w' are also from $W_i$, but the notation $\langle \rangle$ in the denominators of Equation 2 indicates that the geometric mean is taken over the weeks in $W_i$. Base demand cancels out because it is assumed to be constant for a given item-location from week to week, and therefore the geometric mean of the base demand is equal to the base demand. Thus, taking the first ratio cancels the effects of base demand for an item-location.

The quantity $$\left( \frac{P_{i,w}}{\langle P_{i,w'} \rangle} \right)^\gamma$$

in Equation 2 is the simplification of $$\left( \frac{PE_{i,w}}{\langle PE_{i,w'} \rangle} \right)^\gamma$$

according to the power-law price effect parameterization, in which $P_{i,w}$ is the price of item i at week w and γ is a price elasticity parameter that is common across all items in a given item partition.

$$\left( \frac{P_{i,w}}{\langle P_{i,w'} \rangle} \right)^\gamma$$

is further simplified for notation purposes to $(pr_{i,w})^\gamma$.

A second ratio "dr" is constructed between the first (base demand-canceling) ratio for the item-location i and a geometric mean of base demand-canceling ratios for a group $O_i$ of item-locations j (not including i) that have among their weeks of data the weeks in $W_i$. For each item-location j, the first ratio $r_{j,w}$ is formed using the weeks in $W_i$. Then, the second ratio for item-location i is formed as follows:

$$dr_{i,w} \equiv \frac{\frac{S_{i,w}}{\langle S_{i,w'} \rangle}}{\left\langle \frac{S_{j,w}}{\langle S_{j,w'} \rangle} \right\rangle} = \frac{\frac{SE_w}{\langle SE_{w'} \rangle}}{\left\langle \frac{SE_w}{\langle SE_{w'} \rangle} \right\rangle} \cdot \left( \frac{pr_{i,w}}{\langle pr_{j,w} \rangle} \right)^\gamma \quad \text{(Equation 3)}$$

$$= \left( \frac{pr_{i,w}}{\langle pr_{j,w} \rangle} \right)^\gamma$$

In Equation 3, the outer set of $\langle \rangle$ means that the geometric mean is taken across the item-locations j in $O_i$. The seasonality factor in each $r_{j,w}$ will not vary across item-locations j in $O_i$ because the same weeks $W_i$ are used to form each $r_{j,w}$. Because the seasonality factor does not vary, dividing by the geometric mean taken across the item-locations j in $O_i$ then cancels out the seasonality factor. $O_i$ need not include all item-locations, depending on what weeks of data are available for each item-location j. However, using as many item-locations as possible in $O_i$ reduces bias that could result from using a limited number of item-locations. A larger $O_i$ typically results in an improved statistical reliability of the result. In addition, $O_i$ must not be empty, because at least one other item-location that has the weeks $W_i$ is needed to form the second ratio to cancel out the seasonality factor.

The second ratio, shown in Equation 3, has the effect of canceling the effects of seasonality for an item-location, thereby isolating the elasticity related variables. Further simplification of Equation 3 by taking logarithms produces a linear model to which Ordinary Least Squares, or other solution techniques, can be applied:

$$\ln\left(\frac{\frac{S_{i,w}}{\langle S_{i,w'}\rangle}}{\left(\frac{S_{j,w}}{\langle S_{j,w'}\rangle}\right)}\right) \sim \gamma \cdot \ln\left(\frac{pr_{i,w}}{\langle pr_{j,w}\rangle}\right) \quad \text{(Equation 4)}$$

The only unknown quantity in Equation 4 is γ, the elasticity parameter. The left hand side of the equation is a ratio of known sales quantities and $pr_{i,w}$ is a ratio of known price values. For the sake of simplicity, in this description the transformed demand model includes only elasticity-related demand parameters. Additional demand parameters, such as, for example, inventory effect may also be included in the transformed demand model so long as the transformed demand model contains few enough variables for in-database processing. If inventory effect is included in the transformed demand model, the transformed demand model in Equation 4 is would be modified as follows:

$$\ln\left(\frac{\frac{S_{i,w}}{\langle S_{i,w'}\rangle}}{\left(\frac{S_{j,w}}{\langle S_{j,w'}\rangle}\right)}\right) \sim \gamma \cdot \ln\left(\frac{pr_{i,w}}{\langle pr_{j,w}\rangle}\right) + \beta \cdot \ln\left(\frac{ir_{i,w}}{\langle ir_{j,w}\rangle}\right) \quad \text{Equation 5}$$

Where β represents inventory effect related parameters and $ir_{i,w}$ is a known ratio of inventory values.

One consideration in performing the double-ratio technique for transforming a demand model is the selection of weeks in $W_i$. A simple case for selecting $W_i$ is when the item-location i and all the other item-locations have all weeks of data, in which case $W_i$ is simply all weeks, and $O_i$ is all of the items other than i. It is possible, however, for item-locations to not have data for all weeks. Some weeks could be unavailable from the retailer or could have been filtered out as being unreliable. It is also necessary to filter out weeks with 0 sales, because such data would result in denominators of 0 in the ratios used to compute the transformed demand model.

When data is not available for all item-locations for all weeks, one approach is to select a few weeks immediately surrounding the first price decrease of i (called "the first markdown principle"). This choice has the added benefit of producing an estimate of elasticity that is undiluted by the elasticities of successive price decreases. Frequently, price decreases have different elasticities associated with them depending on how far along they occur during the selling season. Thus, it may be preferable if the measurement of elasticity is performed using data for the first markdown instead of using data for all markdowns.

Choosing each $W_i$ to have fewer weeks makes it easier to ensure that $O_i$ is not empty, since if $W_i$ has fewer weeks it is easier to ensure that some other item-location includes those weeks. However, choosing fewer weeks results in less statistically reliable results. Without sufficient data, it may not be possible to reliably separate out the effects of elasticity from the effects of seasonality. In other words, it may not be possible to reliably attribute a change in sales to elasticity as opposed to seasonality. A significant overlap in weeks between item-locations produces improved reliability. Recognizing this fact, $W_i$ would ideally be chosen as all weeks of common overlap among all item-locations. In practice, if there are many item-locations, item-locations may be included in $O_i$ that lack data for a small number of weeks in $W_i$. While this is not completely correct mathematically speaking, the error is generally small, and thus the effect of the incomplete data on the reliability of the estimated demand parameters can be neglected for the sake of efficient computation.

Returning to the method 300, at 320 the retail panel data is transformed in the same manner as the demand model. For a given retail item-location, the double-ratio shown on the left hand side of Equation 4 is computed as well as the transformed price data on the right hand side of Equation 4. At 330, the elasticity equation is solved using the transformed retail panel data to estimate an elasticity of demand for the retail item. One convenient technique for solving the elasticity equation is Ordinary Least Squares, which involves matrix algebra techniques readily implemented in database systems when the number of demand variables is small (as in the transformed demand model).

In one embodiment, solution of the elasticity equation is performed using SQL code that manipulates the data and performs calculations with minimal use of Java. This approach avoids disadvantages associated with transferring data out of a database to a computer running Java. For example, SQL code is usually more compact than equivalent Java code, enhancing maintenance and readability. SQL running on Oracle can automatically make use of built-in Oracle parallelism, with no additional code required. The sales data can remain in the data base during all phases of computation, avoiding the overhead of transferring the data over a network.

In the described embodiment, Java is used to construct the text of SQL queries and to send the queries to a database server for execution. The actual data manipulation and calculation are performed in SQL. Thus Java acts as merely the coordinator for sending SQL queries to the database. The double-ratio technique used to obtain the transformed demand model lends itself well to the use of SQL. Retail data is typically analyzed in partitions, using at least one regression per partition. Given that there can be many tens of thousands or even hundreds of thousands of partitions, the efficiencies in computing provided by the described SQL implementation are significant.

In one embodiment, the SQL implementation is structured as a sequence of queries, the output of each of which forms the input to the next query. Each query has the form "Create Table <tablename> nologging parallel as Select . . . ". Each query thus produces a table with name <tablename>; <tablename> contains the results that will form the input into the next query. The table <tablename> is deleted once its contents are no longer needed to conserve disk space. The text of each query is constructed in Java, and then executed from Java. But since the query puts its results into the table in the database, no data is transferred to Java. Java simply executes the queries one after the other.

Each query handles all partitions so that they do not need to be handled individually. In fact, the Create-Table statements can be written to handle all partitions simultaneously so that the database can apply parallelism. Each table's primary key will include columns that specify the partition, thus allowing simultaneous handling of all partitions.

The queries break down into two groups. The first group of queries, executed first, is the set of queries that performs the double-ratio transformation, transforming the historical sales and price data according to Equation 4. The second group of queries performs the regression on the transformed data. The regression is performed by explicitly constructing the regression matrix and inverting it. The regression matrix can be constructed using SQL. Each partition has its own regression matrix, but a single SQL query can be used to construct matrices for all partitions simultaneously. The query puts all of the regression matrices into a single table whose primary key is the partition. Each row contains all of the elements of the regression matrix for a particular partition.

Once the regression matrices are in a table, the matrices can be inverted. If the matrices are 2×2 matrices, meaning that the transformed demand model includes elasticity and only one other demand variable (e.g., inventory effect, see Equation 5), appropriate SQL can be written to invert the matrices. If more demand variables are present, a built-in matrix inversion function in Oracle can be invoked that allows inversions to be performed in parallel with a SQL query. The result of inversion is a table that contains the inverse of all matrices in the regression-matrix table. Having a transformed demand model with very few remaining demand variables (e.g., elasticity and only one or two additional variables) allows the above described inversion of regression matrices to be performed in database using SQL.

Returning to FIG. 3, at 340, base demand and seasonality for the retail item are estimated based, at least in part, on the estimated elasticity of demand γ for the retail item. Estimating base demand and seasonality can be performed by substituting the value for elasticity into the first and second ratios for an item and solving the ratios for base demand or seasonality.

In one embodiment, obtaining seasonality and base demand is a two-step procedure involving first calculating seasonality and then calculating base demand. The first step is to form so-called "de-priced sales", which means to take the historical sales-units data and remove price effect from them. In other words, determine what sales would have been had there been no price changes. This is possible once elasticity is known. Referring to Equation 1, if both sides are divided by PE (price effect), then the left hand side is de-priced sales. After then applying the first-ratio transformation, we get an equation similar to Equation 2 except that the right-hand side contains only factors involving seasonality.

Taking the logarithms of both sides of Equation 2 yields a logarithm-linear model involving only seasonality. Applying regression then gives values for seasonality. Given the seasonality values, Equation 1 can be used to obtain base demand. Both sides of Equation 1 are divided by price effect and seasonality. The left-hand side then contains "de-priced, de-seasonalized" sales, while the right-hand side contains only base demand. Recall that each item-location i has its own base demand $BD_i$. Now $BD_i$ can be obtained taking the average of de-priced, de-seasonalized sales over the weeks of i.

Solving directly for seasonality is time-consuming, since there can be as many as 52 seasonality variables (one for each week of the year). If the data is daily level then it is of course even worse, with 365 seasonality variables, one for each day of the year. While full mathematical correctness demands solving for seasonality as outlined above, in practice it may not be worth the effort, and moreover such an approach would render pointless one of the benefits of the double-ratio method, namely performing a regression for elasticity that does not include seasonality. One alternative approach can be used when the weeks of data are not sparse (that is, where most item-locations have most of their weeks of data). Such dense data typically occurs where the item-locations have high rates of sale, and thus this technique mainly applies to high rates of sale. In such cases, to obtain seasonality, for each week, the de-priced sales can be summed for that week over all item-locations. This gives a single sales curve over 52 weeks. To obtain seasonality, the curve is normalized to a rate of 1 unit of sale per week (seasonality curves by definition have an average rate of sale of 1 unit per week). Obtaining the seasonality curve in this way can be easily coded in SQL, and executes very quickly in an Oracle database.

If all item-locations have all weeks of data, then in fact the alternative approach described above is mathematically correct. For week w, what is described above amounts to:

$$\left(\sum_i BD_i\right) \cdot SEw \qquad \text{Equation 6}$$

where the sum is over all item-locations i. Normalizing to a rate of 1 unit of sale per week then removes $\Sigma BD_i$, so that what is left is just $SE_w$, thus yielding seasonality. This technique is not well suited for the case of sparse data since it is not mathematically correct and moreover the resulting seasonality will be highly unreliable, as the resulting seasonality values are too easily influenced by noise in the data when the data is so sparse.

Returning again to FIG. 3, at 350, demand variables that can be used to produce a sales forecast for the retail item can be provided based on the demand model constructed using the estimated base demand, seasonality, and elasticity parameters determined in steps 310-340.

Figure 4:
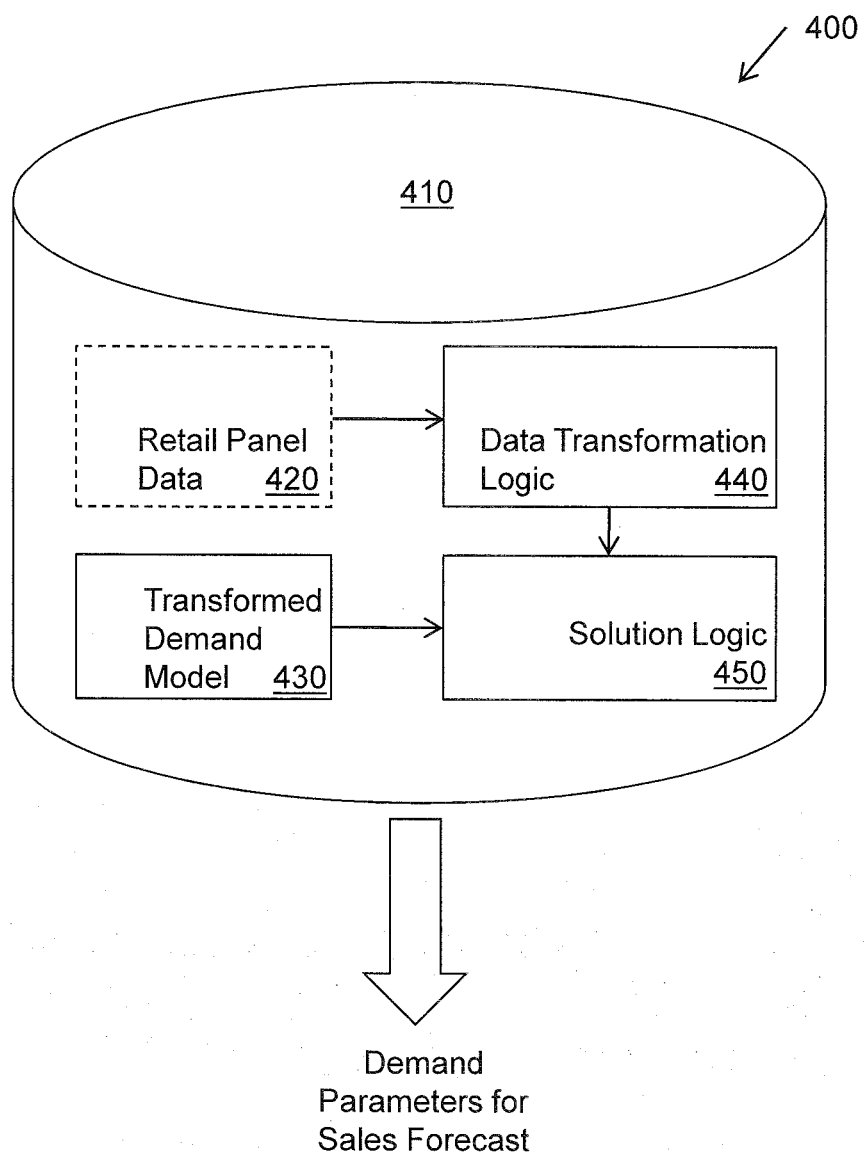
FIG. 4 illustrates an example embodiment of a system associated with scalable regression for retail panel data.

FIG. 4 illustrates one example embodiment of a computing system 400 that provides a sales forecast for retail items using a demand model and retail panel data. The system 400 includes a database 410. The database 410 is the database that stores retail panel data 420 describing historic sales for a plurality of item-locations over time. The database 420 also stores a transformed demand model 430. The transformed demand model 430 includes an elasticity equation that does not depend on base demand or seasonality.

The system 400 also includes a data transformation logic 420 configured to transform retail panel data to cancel effects of base demand and seasonality for a first retail item. A solution logic 450 is configured to solve the elasticity equation using the transformed retail panel data to estimate an elasticity of demand for the first retail item. The solution logic 450 is also configured to estimate base demand and seasonality for the first retail item based, at least in part, on the estimated elasticity of demand for the first retail item. The solution logic 450 may also be configured to provide demand parameters used to compute a sales forecast for the first retail item based on the estimated base demand, seasonality, and elasticity.

In some embodiments, the data transformation logic 440 is configured to transform the retail panel data by constructing a first item base demand-canceling ratio between demand for the first retail item at a given location during a first time increment and a geometric mean of demand for the first retail item at the given location during other time increments. The data transformation logic 440 constructs item base demand-canceling ratios for other retail items related to the first retail item. To cancel the effects of seasonality, the first item base demand-canceling ratio is then divided by geometric mean of the item base demand canceling ratios for the related items.

In some embodiments, the solution logic 450 is configured to estimate base demand and seasonality for the retail item by solving the season-canceling ratio and first base demand-canceling ratio with the estimated elasticity of demand.

Figure 5:
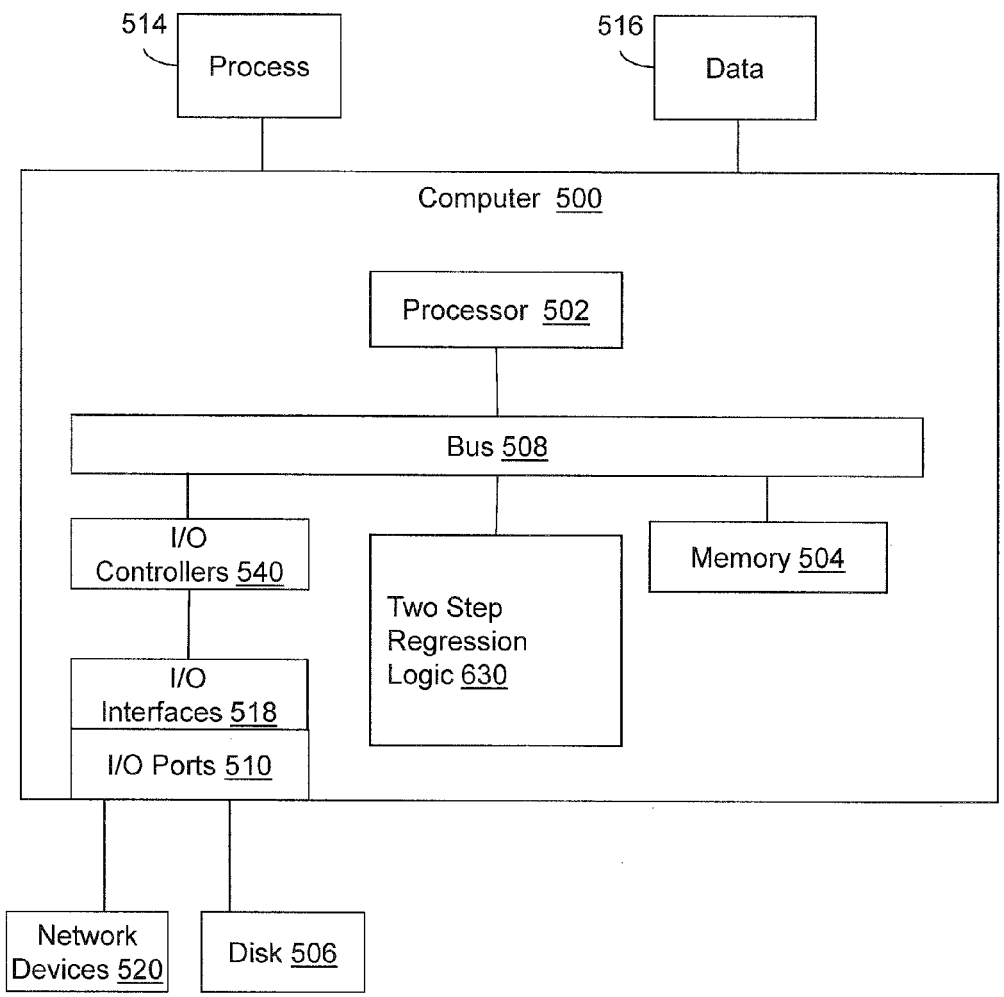
FIG. 5 illustrates an example embodiment of a computing device in which example systems and methods described herein, and equivalents, may operate.

FIG. 5 illustrates an example computing device in which example systems and methods described herein, and equivalents, may operate. The example computing device may be a computer 500 that includes a processor 502, a memory 504, and input/output ports 510 operably connected by a bus 508. In one example, the computer 500 may include a two-step regression logic 530 configured to facilitate performing regression on a retail demand model. In different examples, the logic 530 may be implemented in hardware, a non-transitory computer-readable medium with stored instructions, firmware, and/or combinations thereof. While the logic 530 is illustrated as a hardware component attached to the bus 508, it is to be appreciated that in one example, the two-step regression logic 530 could be implemented in the processor 502.

In one embodiment, two-step regression logic 530 is a means (e.g., hardware, non-transitory computer-readable medium, firmware) for performing a first regression that estimates elasticity of demand for a retail item, wherein the regression is performed on a transformation of a demand model that does not include variables associated with base demand or seasonality.

The means may be implemented, for example, as an ASIC (application specific integrated circuit) programmed to perform the two-step regression. The means may also be implemented as stored computer executable instructions that are presented to computer 500 as data 516 that are temporarily stored in memory 504 and then executed by processor 502.

Two-step regression logic 530 may also provide means (e.g., hardware, non-transitory computer-readable medium that stores executable instructions, firmware) for performing a second regression that estimates a base demand and seasonality for the retail item based, at least in part, on the estimated elasticity of demand.

Generally describing an example configuration of the computer 500, the processor 502 may be a variety of various processors including dual microprocessor and other multi-processor architectures. A memory 504 may include volatile memory and/or non-volatile memory. Non-volatile memory may include, for example, ROM (read only memory), PROM (programmable read only memory), and so on. Volatile memory may include, for example, RAM (random access memory), SRAM (synchronous RAM), DRAM (dynamic RAM), and so on.

A disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM drive, a CD-R (CD recordable) drive, a CD-RW (CD rewriteable) drive, a DVD ROM, and so on. The memory 504 can store a process 514 and/or a data 516, for example. The disk 506 and/or the memory 504 can store an operating system that controls and allocates resources of the computer 500.

The bus 508 may be a single internal bus interconnect architecture and/or other bus or mesh architectures. While a single bus is illustrated, it is to be appreciated that the computer 500 may communicate with various devices, logics, and peripherals using other busses (e.g., PCIE (peripheral component interconnect express), 1394, USB (universal serial bus), Ethernet). The bus 508 can be types including, for example, a memory bus, a memory controller, a peripheral bus, an external bus, a crossbar switch, and/or a local bus.

The computer 500 may interact with input/output devices via the i/o interfaces 518 and the input/output ports 510. Input/output devices may be, for example, a keyboard, a microphone, a pointing and selection device, cameras, video cards, displays, the disk 506, the network devices 520, and so on. The input/output ports 510 may include, for example, serial ports, parallel ports, and USB ports.

The computer 500 can operate in a network environment and thus may be connected to the network devices 520 via the i/o interfaces 518, and/or the i/o ports 510. Through the network devices 520, the computer 500 may interact with a network. Through the network, the computer 500 may be logically connected to remote computers. Networks with which the computer 500 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Logic", as used herein, includes but is not limited to hardware, firmware, a non-transitory computer readable medium that stores instructions, instructions in execution on a machine, and/or combinations of each to perform a function(s) or an action(s), and/or to cause a function or action from another logic, method, and/or system. Logic may include a microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alteratios, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A non-transitory computer-readable medium storing computer-executable instructions that when executed by a computer cause the computer to perform a method, the method comprising:
    accessing a demand model and retail panel data describing historic demand for a plurality of retail products over time;
    transforming the retail panel data to cancel effects of base demand and seasonality for a first retail item;
    solving an elasticity equation using the transformed retail panel data to estimate an elasticity of demand for the first retail item; where the elasticity equation comprises a transformed version of the demand model for the plurality of retail products that has been transformed to cancel effects of base demand and seasonality;
    estimating base demand and seasonality for the first retail item based, at least in part, on the estimated elasticity of demand for the first retail item and an un-transformed version of the demand model that includes effects of base demand and seasonality;
    providing the estimated elasticity, base demand, and seasonality for use in determining a sales forecast for the first retail item.

2. The non-transitory computer-readable medium of claim 1, wherein the transforming of the retail panel data is performed in a database storing the retail panel data.

3. The non-transitory computer-readable medium of claim 1, wherein the solving of the elasticity equation and the estimating of base demand and seasonality are performed in a database storing the retail panel data.

4. The non-transitory computer-readable medium of claim 1, wherein transforming the retail panel data comprises:
    constructing a first item base demand-canceling ratio between demand for the first retail item at a given location during a first time increment and a geometric mean of demand for the first retail item at the given location during other time increments;
    constructing a set of item base demand canceling ratios for a set of retail items related to the first retail item; and
    constructing a season-canceling ratio between the first item base demand-canceling ratio and a geometric mean of the set of item base demand canceling ratios constructed for the set of retail items related to the first retail item.

5. The non-transitory computer-readable medium of claim 4, the instructions for solving the elasticity equation further comprising solving a linear regression produced by taking logarithms of the season-canceling ratio.

6. The non-transitory computer-readable medium of claim 5, wherein solving the elasticity equation comprises solving the linear regression using Ordinary Least Squares to estimate elasticity of demand for the retail item.

7. The non-transitory computer-readable medium of claim 5, wherein estimating base demand and seasonality for the retail item comprises solving the season-canceling ratio and first item base demand-canceling ratio with the estimated elasticity of demand.

8. The non-transitory computer-readable medium of claim 1, wherein the transforming of the retail panel data, the solving of the elasticity equation, and the estimating of the base demand and seasonality are performed for each of the plurality of retail items.

9. A computing system comprising
    a database configured to store a demand model for a plurality of retail products that includes effects of base demand and seasonality, an elasticity equation comprising a transformed version of the demand model transformed such that the transformed demand model does not depend on base demand or seasonality, the database further configured to store retail panel data describing historic demand for the plurality of retail products over time;
    a processor configured to cause the computing system to operate with a group of logics, the group of logics including:
        a data transformation logic configured to transform retail panel data to cancel effects of base demand and seasonality for a given retail item; and
        a solution logic configured to solve the elasticity equation using the transformed retail panel data to estimate an elasticity of demand for the retail item and to estimate base demand and seasonality for the retail item based, at least in part, on the estimated elasticity of demand for the retail item and the demand model.

10. The computing system of claim 9, wherein the data transformation logic is stored in the database.

11. The computing system of claim 9, wherein the solution logic is stored in the database.

12. The computing system of claim 9, wherein the data transformation logic is configured to transform the retail panel data by:
    constructing a first item base demand-canceling ratio between demand for the first retail item at a given location during a first time increment and a geometric mean of demand for the first retail item at the given location during other time increments;

constructing a set of item base demand canceling ratios for a set of retail items related to the first retail item; and constructing a season-canceling ratio between the first item base demand-canceling ratio and a geometric mean of the set of item base demand canceling ratios constructed for the set of retail items related to the first retail item.

13. The computing system of claim 12 wherein the solution logic is configured to solve a linear regression produced by taking logarithms of the season-canceling ratio.

14. The computing system of claim 13, wherein the solution logic is configured to estimate base demand and seasonality for the first retail item by solving the season-canceling ratio and first item base demand-canceling ratio for an instance of the demand model corresponding to the first retail item with the estimated elasticity of demand.

15. A non-transitory computer-readable medium storing computer-executable instructions that when executed by a computer cause the computer to perform a method, the method comprising:

performing a regression that estimates elasticity of demand for a retail item, wherein the regression is performed on a transformation of a demand model and retail demand data that have been transformed to cancel the effects of base demand and seasonality;

in a subsequent processing step, estimating a base demand and seasonality for the retail item based, at least in part, on the estimated elasticity of demand and an un-transformed version of the demand model that includes the effects of base demand and seasonality; and wherein the performing a regression and estimating are performed in a database that stores retail panel data for the retail item and other retail items.

16. The non-transitory computer-readable medium of claim 15, the instructions further comprising: transforming the retail panel data by:

constructing a first item base demand-canceling ratio between demand for the first retail item at a given location during a first time increment and a geometric mean of demand for the first retail item at the given location during other time increments;

constructing a set of item base demand canceling ratios for a set of retail items related to the first retail item; and constructing a season-canceling ratio between the first item base demand-canceling ratio and a geometric mean of the set of item base demand canceling ratios constructed for the set of retail items related to the first retail item.

17. The non-transitory computer-readable medium of claim 16, wherein performing the regression comprises solving a linear regression produced by taking logarithms of the season-canceling ratio.

18. The non-transitory computer-readable medium of claim 17, comprising solving the linear regression using Ordinary Least Squares to estimate elasticity of demand for the retail item.

19. The non-transitory computer-readable medium of claim 16, the instructions further comprising providing a sales forecast for the retail item based on the estimated elasticity, base demand, and seasonality.

20. The non-transitory computer-readable medium of claim 1, wherein the elasticity equation comprises a natural log of a ratio of sales quantities for the retail item to sales quantities for other retail items in the plurality of retail items divided by a natural log of a ratio of prices for the retail item to prices for the other retail items.

21. A computer-implemented method comprising:

accessing, by a processor, retail panel data describing historic demand for a plurality of retail products over time;

transforming, by the processor, the retail panel data to cancel effects of base demand and seasonality for a first retail item;

solving, by the processor, an elasticity equation using the transformed retail panel data to estimate an elasticity of demand for the first retail item; where the elasticity equation comprises a transformed demand model for the plurality of retail products that has been transformed to cancel effects of base demand and seasonality;

estimating, by the processor, base demand and seasonality for the first retail item based, at least in part, on the estimated elasticity of demand for the first retail item and an un-transformed version of the demand model that includes effects of base demand and seasonality;

providing, by the processor, the estimated elasticity, based demand, and seasonality for use in determining a sales forecast for the first retail item.

22. The computer-implemented method of claim 21, wherein the transforming of the retail panel data is performed in a database storing the retail panel data.

23. The computer-implemented method of claim 21, wherein the solving of the elasticity equation and the estimating of base demand and seasonality are performed in a database storing the retail panel data.

24. The computer-implemented method of claim 21, wherein transforming the retail panel data comprises:

constructing a first item base demand-canceling ratio between demand for the first retail item at a given location during a first time increment and a geometric mean of demand for the first retail item at the given location during other time increments;

constructing a set of item base demand canceling ratios for a set of retail items related to the first retail item; and constructing a season-canceling ratio between the first item base demand-canceling ratio and a geometric mean of the set of item base demand canceling ratios constructed for the set of retail items related to the first retail item.

25. The computer-implemented method of claim 24, wherein solving the elasticity equation further comprises solving a linear regression produced by taking logarithms of the season-canceling ratio.

26. The computer-implemented method of claim 25, wherein solving the elasticity equation comprises solving the linear regression using Ordinary Least Squares to estimate elasticity of demand for the retail item.

27. The computer-implemented method of claim 25, wherein estimating base demand and seasonality for the retail item comprises solving the season-canceling ratio and first item base demand-canceling ratio with the estimated elasticity of demand.

28. The computer-implemented method of claim 21, wherein the transforming of the retail panel data, the solving of the elasticity equation, and the estimating of the base demand and seasonality are performed for each of the plurality of retail items.

* * * * *

UNITED STATES PATENT AND TRADEMARK OFFICE
CERTIFICATE OF CORRECTION

| | | |
|---|---|---|
| PATENT NO. | : 8,751,289 B2 | Page 1 of 1 |
| APPLICATION NO. | : 13/101276 | |
| DATED | : June 10, 2014 | |
| INVENTOR(S) | : Popkov et al. | |

It is certified that error appears in the above-identified patent and that said Letters Patent is hereby corrected as shown below:

In the Specification

In column 11, lines 15-16, delete "alteratios," and insert -- alterations, --, therefor.

Signed and Sealed this
Third Day of February, 2015

Michelle K. Lee
*Deputy Director of the United States Patent and Trademark Office*